(12) United States Patent
Hyung et al.

(10) Patent No.: US 11,496,196 B2
(45) Date of Patent: Nov. 8, 2022

(54) APPARATUS AND METHOD FOR DETERMINING TRANSMISSION POWER IN WIRELESS COMMUNICATION SYSTEM

(71) Applicant: Samsung Electronics Co., Ltd., Gyeonggi-do (KR)

(72) Inventors: Seokkun Hyung, Gyeonggi-do (KR); Bongsup Son, Gyeonggi-do (KR); Dongju Lee, Gyeonggi-do (KR); Wonjin Choi, Gyeonggi-do (KR); Janghoon Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/966,654

(22) PCT Filed: Feb. 14, 2019

(86) PCT No.: PCT/KR2019/001817
§ 371 (c)(1),
(2) Date: Jul. 31, 2020

(87) PCT Pub. No.: WO2019/160350
PCT Pub. Date: Aug. 22, 2019

(65) Prior Publication Data
US 2020/0358511 A1    Nov. 12, 2020

(30) Foreign Application Priority Data
Feb. 14, 2018    (KR) .......... 10-2018-0018345

(51) Int. Cl.
*H04B 7/06* (2006.01)
*H04B 7/04* (2017.01)
(Continued)

(52) U.S. Cl.
CPC ......... *H04B 7/0632* (2013.01); *H04B 7/0404* (2013.01); *H04B 17/318* (2015.01);
(Continued)

(58) Field of Classification Search
None
See application file for complete search history.

(56) References Cited

U.S. PATENT DOCUMENTS 9,634,697 B2    4/2017  Natesan et al.
2013/0100828 A1   4/2013  Kishiyama et al.
(Continued)

FOREIGN PATENT DOCUMENTS

KR    10-2012-0086300 A    8/2012
KR    10-2013-0024898 A    3/2013
KR    10-2014-0112590 A    9/2014

OTHER PUBLICATIONS

3rd Generation Partnership Project; 3GPP TS 36.214 V16.0.0. pp. 1-26.
(Continued)

*Primary Examiner* — Yemane Mesfin
*Assistant Examiner* — Jeff Banthrongsack
(74) *Attorney, Agent, or Firm* — Cha & Reiter, LLC

(57) ABSTRACT

Various embodiments of the disclosure relate to a 5$^{th}$ generation (5G) or pre-5G communication system for supporting a data transfer rate higher than that of a 4$^{th}$ generation (4G) communication system such as LTE (long term evolution). An operating method of an electronic device according to various embodiments may include: receiving a reference signal from a base station via a plurality of antennas; acquiring path loss values respectively corresponding to the antennas, based on the reference signal; determining at least two antennas among the antennas, based on frequency band information received from the base station; acquiring a ratio
(Continued)

for the path loss values corresponding to the determined at least two antennas; and transmitting a signal via the at least two antennas, based on the acquired ratio.

12 Claims, 11 Drawing Sheets

(51) Int. Cl.
  *H04W 52/24*   (2009.01)
  *H04W 72/04*   (2009.01)
  *H04L 5/00*   (2006.01)
  *H04B 17/318*   (2015.01)
  *H04B 7/0404*   (2017.01)

(52) U.S. Cl.
  CPC ......... *H04L 5/0051* (2013.01); *H04W 52/242* (2013.01); *H04W 72/0453* (2013.01)

(56) References Cited

U.S. PATENT DOCUMENTS

| | | |
|---|---|---|
| 2015/0230190 A1 | 8/2015 | Shin et al. |
| 2015/0341248 A1* | 11/2015 | Deng .................... H04L 47/263 370/252 |
| 2016/0278023 A1 | 9/2016 | Kishiyama et al. |
| 2017/0118720 A1 | 4/2017 | Liu |
| 2017/0201954 A1* | 7/2017 | Xiao .................... H04W 52/346 |
| 2017/0280399 A1* | 9/2017 | Chrisikos ............ H04W 52/281 |
| 2019/0221921 A1* | 7/2019 | Resnati ................ H04B 1/0057 |

OTHER PUBLICATIONS

3rd Generation Partnership Project; 3GPP TS 36.321 V16.0.0. pp. 1-141.
Korean Search Report dated Feb. 25, 2022.
Notice if Patent Grant dated Aug. 25, 2022.

\* cited by examiner

APPARATUS AND METHOD FOR DETERMINING TRANSMISSION POWER IN WIRELESS COMMUNICATION SYSTEM

CROSS-REFERENCE TO RELATED APPLICATION(S)

This application is a National Phase Entry of PCT International Application No. PCT/KR2019/001817, which was filed on Feb. 14, 2019, and claims priority to Korean Patent Application No. 10-2018-0018345, which was filed on Feb. 14, 2018, the contents of which are incorporated herein by reference.

TECHNICAL FIELD

Various embodiments of the disclosure relate in general to a wireless communication system, and in particular, to an apparatus and method for determining Transmit (TX) power in the wireless communication system.

BACKGROUND ART

To meet a demand on wireless data traffic which has been in an increasing trend after a 4$^{th}$ Generation (4G) communication system was commercialized, there is an ongoing effort to develop an improved 5$^{th}$ Generation (5G) communication system or a pre-5G communication system. For this reason, the 5G communication system or the pre-5G communication system is called a beyond 4G network communication system or a post Long Term Evolution (LTE) system.

To achieve a high data transfer rate, the 5G communication system is considered to be implemented in an mmWave band (e.g., such as a 60 GHz band). To reduce a propagation path loss at the mmWave band and to increase a propagation delivery distance, beamforming, massive Multiple Input Multiple Output (MIMO), full dimensional MIMO (FD-MIMO), array antenna, analog beam-forming, and large-scale antenna techniques are under discussion in the 5G communication system.

In addition, to improve a network of a system, techniques such as an evolved small cell, an advanced small cell, a cloud Radio Access Network (RAN), an ultra-dense network, Device to Device (D2D) communication, a wireless backhaul, a moving network, cooperative communication, Coordinated Multi-Points (COMP), and reception interference cancellation, or the like are being developed in the 5G communication system.

In addition thereto, Hybrid Frequency shift keying and Quadrature Amplitude Modulation (FQAM) and Sliding Window Superposition Coding (SWSC) as an Advanced Coding Modulation (ACM) technique and Filter Bank Multi Carrier (FBMC), Non Orthogonal Multiple Access (NOMA), and Sparse Code Multiple Access (SCMA), or the like as an advanced access technology are being developed in the 5G system.

DISCLOSURE OF INVENTION

Technical Problem

An electronic device may transmit the same signal via a plurality of Transmit (TX) antennas. Since the same signal is transmitted by using the plurality of TX antennas, a TX diversity effect may be acquired. The TX diversity may improve reliability of transmission, but may cause great power consumption. Therefore, there may be a need for a method for improving output efficiency when a signal is transmitted by using the plurality of TX antennas.

Various embodiments described below may provide an apparatus and method for setting a ratio of TX power for each antenna, based on a path loss for each antenna to improve antenna output efficiency.

Solution to Problem

An operating method of an electronic device according to various embodiments may include: receiving a reference signal from a base station via a plurality of antennas; acquiring path loss values respectively corresponding to the antennas, based on the reference signal; determining at least two antennas among the antennas, based on frequency band information received from the base station; acquiring a ratio for the path loss values corresponding to the determined at least two antennas; and transmitting a signal via the at least two antennas, based on the acquired ratio.

An electronic device in a wireless communication system according to various embodiments may include; a memory; a plurality of antennas; and a processor. The processor may be configured to receive a reference signal from a base station via the antennas, acquire path loss values respectively corresponding to the antennas, based on the reference signal, determine at least two antennas among the antennas, based on frequency band information received from the base station, acquire a ratio for the path loss values corresponding to the determined at least two antennas, and transmit a signal via the at least two antennas, based on the acquired ratio.

Advantageous Effects of Invention

An apparatus and method according to various embodiments of the disclosure can set a ratio of Transmit (TX) power for each antenna, based on a path loss for each antenna.

An apparatus and method according to various embodiments of the disclosure can improve antenna output efficiency by providing differential power control for each antenna.

Advantages acquired in the disclosure are not limited to the aforementioned advantages. Other advantages not mentioned herein can be clearly understood by those skilled in the art to which the disclosure pertains from the following descriptions.

BEST MODE FOR CARRYING OUT THE INVENTION

Terms used in the disclosure are for the purpose of describing particular embodiments only and are not intended to limit other embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based approach is described for example in the various embodiments of the disclosure described hereinafter. However, since the various embodiments of the disclosure include a technique in which hardware and software are both used, a software-based approach is not excluded in the embodiments of the disclosure.

Various embodiments of the disclosure described hereinafter relate to an apparatus and method for determining Transmit (TX) power in a wireless communication system. For example, various embodiments of the disclosure describe a technique for determining TX power of a plurality of TX antennas, based on a path loss in the wireless communication system.

Figure 1:
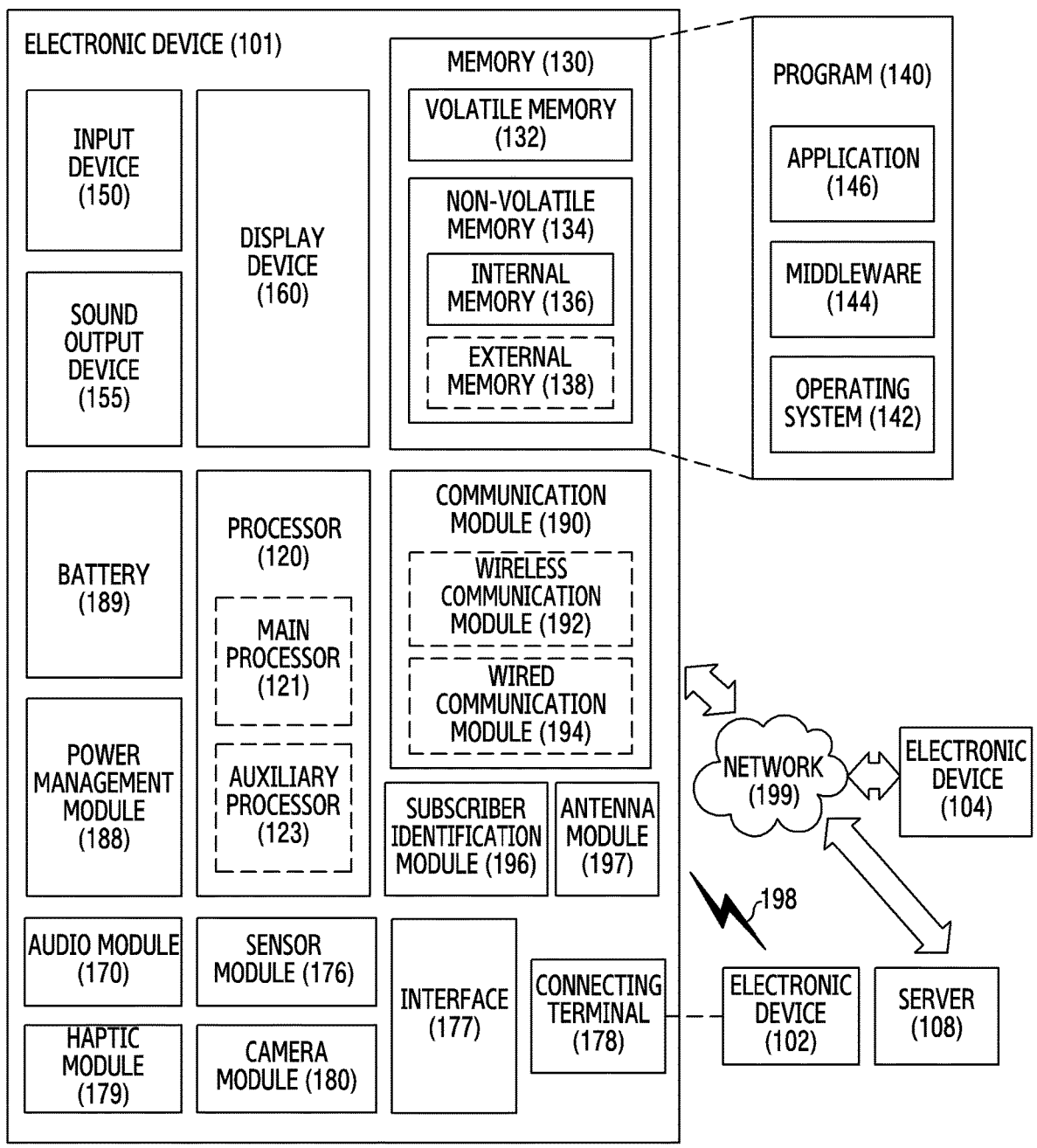
FIG. 1 illustrates a block diagram of an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
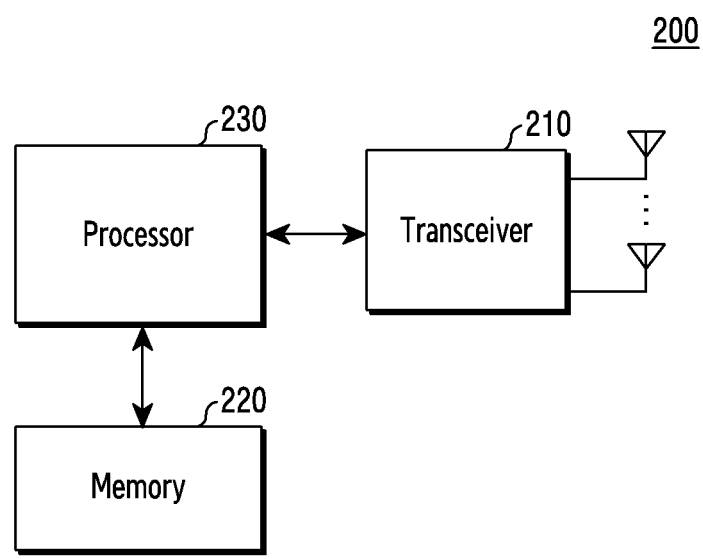
FIG. 2 illustrates a functional structure of an electronic device in a wireless communication system according to various embodiments of the disclosure.

FIG. 2 illustrates a functional structure of an electronic device in a wireless communication system according to various embodiments of the disclosure. The structure of FIG. 2 may be understood as a structure of an electronic device (e.g., the electronic device 101 of FIG. 1). Hereinafter, the term ' . . . unit', ' . . . device', or the like implies a unit of processing at least one function or operation, and may be implemented in hardware or software or in combination of the hardware and the software.

Referring to FIG. 2, the electronic device 101 may include a transceiver 210, a memory 220, and a processor 230.

The transceiver 210 may perform functions for transmitting and receiving a signal via a wireless channel. For example, the transceiver 210 may perform a function of conversion between a baseband signal and a bit-stream according to a physical layer standard of a system. For example, in data transmission, the transceiver 210 may generate complex symbols by coding and modulating a TX bit-stream. In addition, in data reception, the transceiver 210 may restore a Receive (RX) bit-stream by demodulating and decoding a baseband signal. In addition, the transceiver 210 may up-convert a baseband signal into a Radio Frequency (RF) signal and thereafter transmit it via an antenna, and may down-convert an RF signal received via the antenna into a baseband signal. For example, the transceiver 210 may include a TX filter, an RX filter, an amplifier, a mixer, an oscillator, a Digital to Analog Converter (DAC), an Analog to Digital Converter (ADC), or the like.

In addition, the transceiver 210 may include a plurality of TX/RX paths. Further, the transceiver 210 may include at least one antenna array constructed of a plurality of antenna elements. From a hardware aspect, the transceiver 210 may be constructed of a digital circuit and an analog circuit (e.g., a Radio Frequency Integrated Circuit (RFIC)). Herein, the digital circuit and the analog circuit may be implemented as one package. In addition, the transceiver 210 may include a plurality of RF chains. Further, the transceiver 210 may perform beamforming.

In addition, the transceiver 210 may include different communication modules to process signals of different frequency bands. Further, the transceiver 210 may include a plurality of communication modules to support a plurality of different radio access technologies. For example, the different radio access technologies may include Bluetooth Low Energy (BLE), Wireless Fidelity (Wi-Fi), WiFi Gigabyte (WiGig), cellular network (e.g., Long Term Evolution (LTE)), or the like. In addition, different frequency bands may include a Super High Frequency (SHF) (e.g., 2.5 GHz, 5 Ghz) band and a millimeter (mm) wave (e.g., 60 GHz) band.

The transceiver 210 may transmit and receive a signal as described above. Accordingly, the transceiver 210 may be referred to as a transmitter, a receiver, or a transceiver. In addition, in the following description, transmission and reception performed via a wireless channel may be used to imply that the aforementioned processing is performed by the transceiver 210.

The memory 220 may store data such as a basic program, application program, configuration information, or the like for an operation of a terminal. The memory 220 may be constructed of a volatile memory, a non-volatile memory, or a combination of the volatile memory and the non-volatile memory. In addition, the memory 220 may provide the stored data at the request of the processor 230. According to various embodiment, the memory 220 may store information regarding a ratio of a path loss value measured for each antenna and a path loss value between antennas of the same frequency band.

The processor 230 may control overall operations of the terminal. For example, the processor 230 may transmit and receive a signal via the transceiver 210. In addition, the processor 230 may write data to the memory 220, and may read the data. Further, the processor 230 may perform functions of a protocol stack required in a communication standard. In addition, part of the transceiver 210 and the processor 230 may be referred to as a Communication Processor (CP). According to various embodiments, the processor 230 may differentially distribute TX power for a plurality of TX antennas. For example, the processor 230 may control the electronic device 101 to perform operations according to various embodiments described below.

Figure 3A:
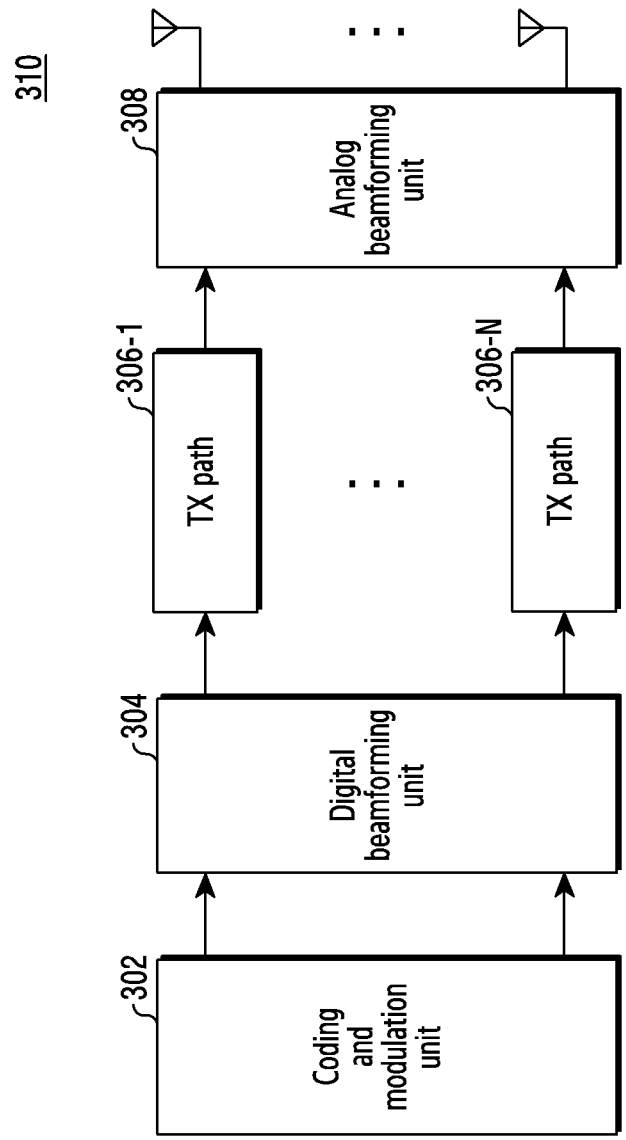
FIG. 3A illustrates a structure of a transceiver of an electronic device in a wireless communication system according to various embodiments of the disclosure.
Figure 3B:
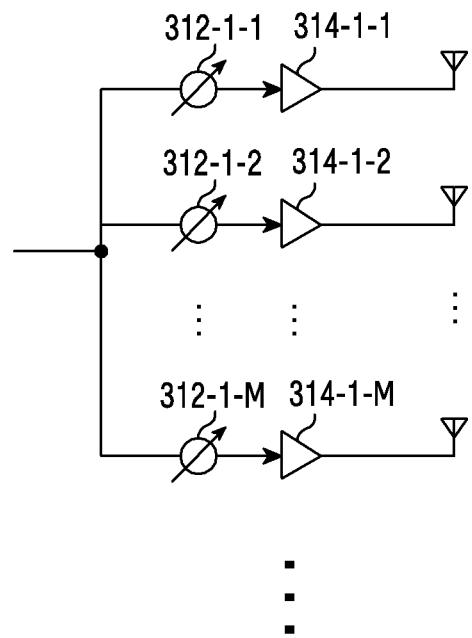
FIG. 3B illustrates a structure of a transceiver of an electronic device in a wireless communication system according to various embodiments of the disclosure.
Figure 3B:
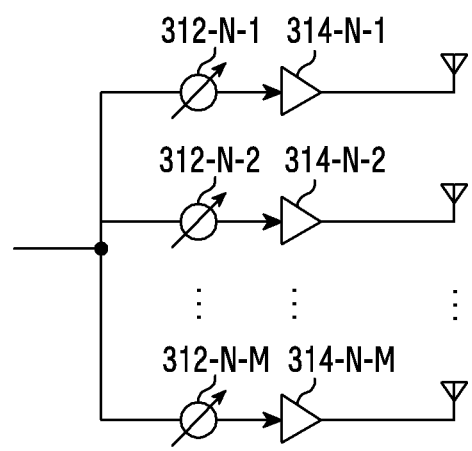

FIG. 3A and FIG. 3B illustrate a structure of a transceiver of an electronic device in a wireless communication system according to various embodiments of the disclosure. An example for a detailed structure of the antenna module 197 of FIG. 1 or the transceiver 210 of FIG. 2 is illustrated in FIG. 3A and FIG. 3B. Specifically, components for performing beamforming are exemplified in FIG. 3A and FIG. 3B, as part of the antenna module 197 of FIG. 1 or the transceiver 210 of FIG. 2.

Referring to FIG. 3A, the transceiver 210 may include a coding and modulation unit 302, a digital beamforming unit 304, a plurality of TX paths 306-1 to 306-N, and an analog beamforming unit 308.

According to various embodiments, the coding and modulation unit 302 may perform channel encoding. For the channel encoding, at least one of a Low Density Parity Check (LDPC) code, a convolution code, and a polar code may be used. The coding and modulation unit 302 may generate modulation symbols by performing constellation mapping.

According to various embodiments, the digital beamforming unit 304 may perform beamforming on a digital signal (e.g., modulation symbols). For this, the digital beamforming unit 304 multiplies the modulation symbols by beamforming weights. The beamforming weights are used to change a magnitude and phase of a signal, and may be referred to as a 'precoding matrix', a 'precoder', or the like. The digital beamforming unit 304 may output modulation symbols subjected to digital beamforming to the plurality of TX paths 306-1 to 306-N. In this case, according to a Multiple Input Multiple Output (MIMO) transmission scheme, the modulation symbols may be multiplexed, or the same modulation symbols may be provided to the plurality of TX paths 306-1 to 306-N.

According to various embodiments, the plurality of TX paths 306-1 to 306-N may convert the digital signals subjected to digital beamforming into an analog signal. For this, each of the plurality of TX paths 306-1 to 306-N may include an Inverse Fast Fourier Transform (IFFT) calculation unit, a Cyclic Prefix (CP) inserting unit, a DAC, an up-conversion unit. The CP inserting unit is for an Orthogonal Frequency Division Multiplexing (OFDM) scheme, and may be excluded when a different physical layer scheme (e.g., Filter Bank Multi-Carrier (FBMC)) is applied. That is, the plurality of TX paths 306-1 to 306-N may provide an independent signal processing process for a plurality of streams generated through digital beamforming. However, according to an implementation scheme, some of components of the plurality of TX paths 306-1 to 306-N may be commonly used.

According to various embodiments, the analog beamforming unit 308 may perform beamforming on an analog signal. For this, the analog beamforming unit 308 may multiply the analog signals by beamforming weights. Herein, the beamforming weights may be used to change a magnitude and phase of a signal. Specifically, according to a connection structure between the plurality of TX paths 306-1 to 306-N and antennas, the analog beamforming unit 308 may be configured as shown in FIG. 3B.

The digital beamforming unit 304 may perform beamforming on a digital signal (e.g., modulation symbols). For this, the digital beamforming unit 304 may multiply the modulation symbols by beamforming weights. Herein, the beamforming weights may be used to change a magnitude and phase of a signal, and may be referred to as a 'precoding matrix', a 'precoder', or the like. The digital beamforming unit 304 may output modulation symbols subjected to digital beamforming to the plurality of TX paths 306-1 to 306-N. In this case, according to a Multiple Input Multiple Output (MIMO) transmission scheme, the modulation symbols may be multiplexed, or the same modulation symbols may be provided to the plurality of TX paths 306-1 to 306-N.

The plurality of TX paths 306-1 to 306-N may convert the digital signals subjected to digital beamforming into an analog signal. For this, each of the plurality of TX paths 306-1 to 306-N may include an Inverse Fast Fourier Transform (IFFT) calculation unit, a Cyclic Prefix (CP) inserting unit, a DAC, an up-conversion unit. The CP inserting unit is for an Orthogonal Frequency Division Multiplexing (OFDM) scheme, and may be excluded when a different physical layer scheme (e.g., Filter Bank Multi-Carrier (FBMC)) is applied. That is, the plurality of TX paths 306-1 to 306-N may provide an independent signal processing process for a plurality of streams generated through digital beamforming. However, according to an implementation scheme, some of components of the plurality of TX paths 306-1 to 306-N may be commonly used.

The analog beamforming unit 308 may perform beamforming on an analog signal. For this, the analog beamforming unit 308 may multiply the analog signals by beamforming weights. Herein, the beamforming weights may be used to change a magnitude and phase of a signal. Specifically, according to a connection structure between the plurality of TX paths 306-1 to 306-N and antennas, the analog beamforming unit 308 may be configured as shown in FIG. 3B.

Referring to FIG. 3B, signals input to the analog beamforming unit 308 may be subjected to operations of phase/magnitude modification and amplification, and then may be transmitted via the antennas. In this case, signals of respective paths may be transmitted via different antenna sets, that is, antenna arrays. Regarding processing of a signal input via a first path, the signal may be converted into a signal stream having a different or identical phase/magnitude by phase/magnitude modification units 312-1-1 to 312-1-M, may be amplified by amplifiers 314-1-1 to 314-1-M, and thereafter may be transmitted via the antennas.

Figure 4:
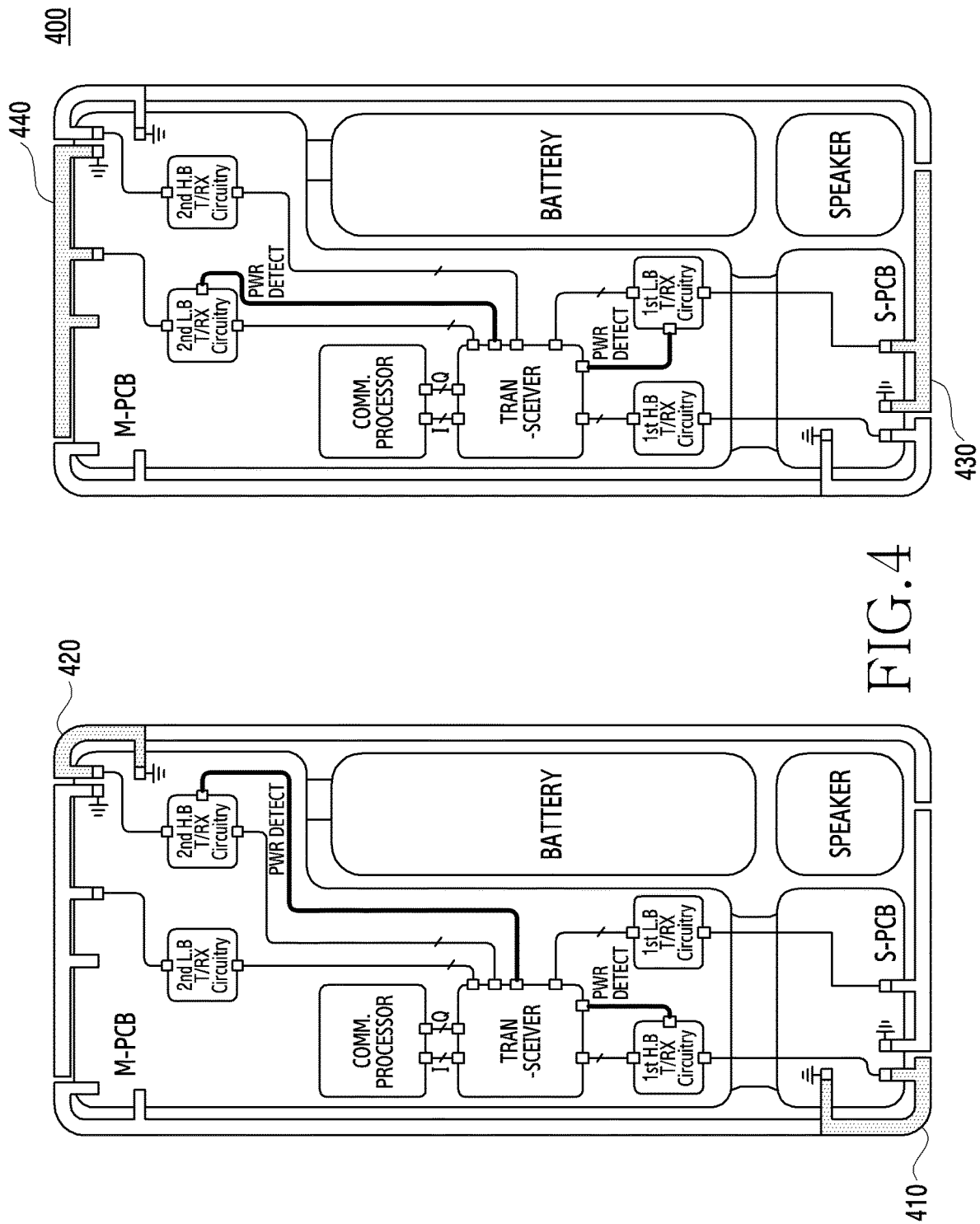
FIG. 4 illustrates a detailed structure of an electronic device in a wireless communication system according to various embodiments of the disclosure.

FIG. 4 is a circuit diagram illustrating a detailed structure of an electronic device according to various embodiments of the disclosure.

Referring to FIG. 4, an electronic device (e.g., the electronic device 101 of FIG. 1) may include a plurality of antennas, and the plurality of antennas may include a first antenna 410, a second antenna 420, a third antenna 430, and a fourth antenna 440. According to various embodiments, the electronic device 101 may include a plurality of TX antennas for each radio frequency band. The plurality of TX antennas may be disposed to an upper/lower portion of a housing of the electronic device 101 according to a frequency characteristic. For example, the plurality of TX antennas may be disposed in a diagonal direction to the upper/lower portion of the housing between antennas having similar frequency characteristics by considering isolation capability between a TX signal and an RX signal.

According to various embodiments, the first antenna 410 and the second antenna 420 may have a high frequency characteristic (e.g., LTE B1 band, uplink: 1920 to 1980 MHz, downlink: 2110 to 2170 MHz, bandwidth: 60 MHz), and the third antenna 430 and the fourth antenna 440 may have a low frequency characteristic (e.g., LTE B5 band, uplink: 824 to 849 MHz, downlink: 869 to 894 MHz, bandwidth: 25 MHz). For example, the third antenna 430 and fourth antenna 440 having the low frequency characteristic may include a physically long antenna according to the low frequency characteristic in which a wavelength is long. As shown in FIG. 4, the first antenna 410 to the fourth antenna 440 may be predetermined in a hardware manner according to a characteristic for each frequency band.

According to an embodiment, the first antenna 410 to the fourth antenna 440 may be disposed on one main Printed Circuitry Board (hereinafter, PCB). The main PCB may further include a communication processor and a transceiver. The transceiver may provide an electrical connection with the first antenna 410 to the fourth antenna 440.

Figure 5:
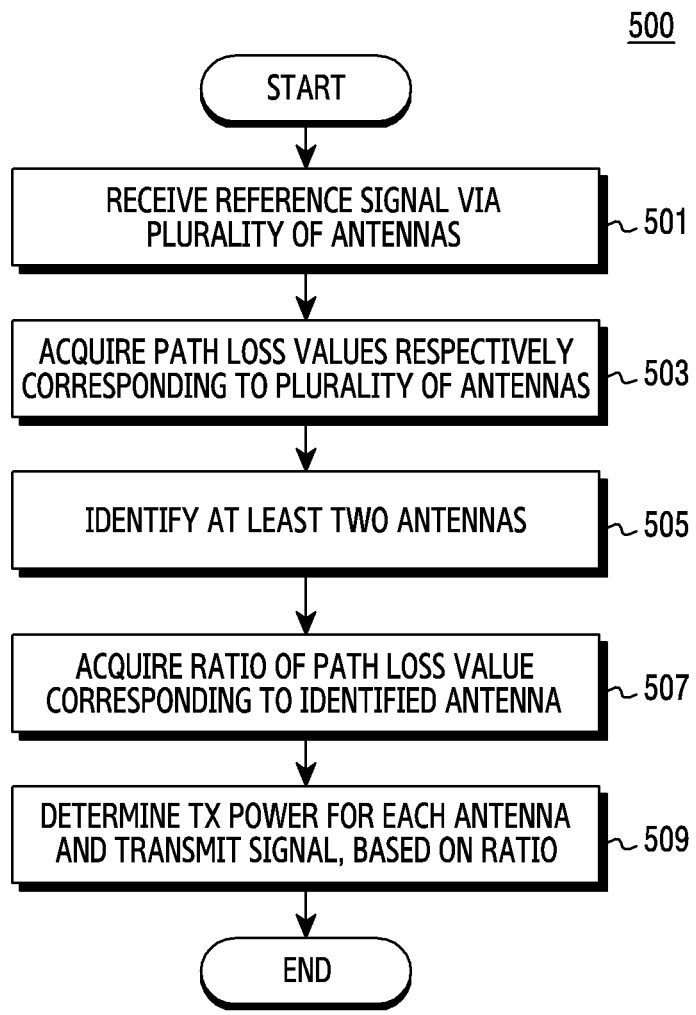
FIG. 5 illustrates a flowchart for determining a Transmit (TX) power ratio of an electronic device in a wireless communication system according to various embodiments of the disclosure.

FIG. 5 illustrates a flowchart for determining a TX power ratio of an electronic device in a wireless communication system according to various embodiments of the disclosure. In FIG. 5, an operating method of an electronic device (e.g., the electronic device 101 of FIG. 1) is exemplified.

Referring to FIG. 5, in operation 501, the electronic device 101 may receive a reference signal via a plurality of antennas. The electronic device 101 may receive the reference signal transmitted from a base station, via the plurality of antennas. The plurality of antennas may include at least one of the first antenna 410, second antenna 420, third antenna 430, and fourth antenna 440 of FIG. 4. According to an embodiment, the electronic device 101 may receive the reference signal in a Radio Resource Control (RRC)_Idle state. The RRC_Idle state is a state in which an RRC connection is not established between the electronic device 101 and the base station, and may be referred to as a standby mode or the like. According to another embodiment, the electronic device 101 may receive the reference signal in initial access with the base station.

Figure 6A:
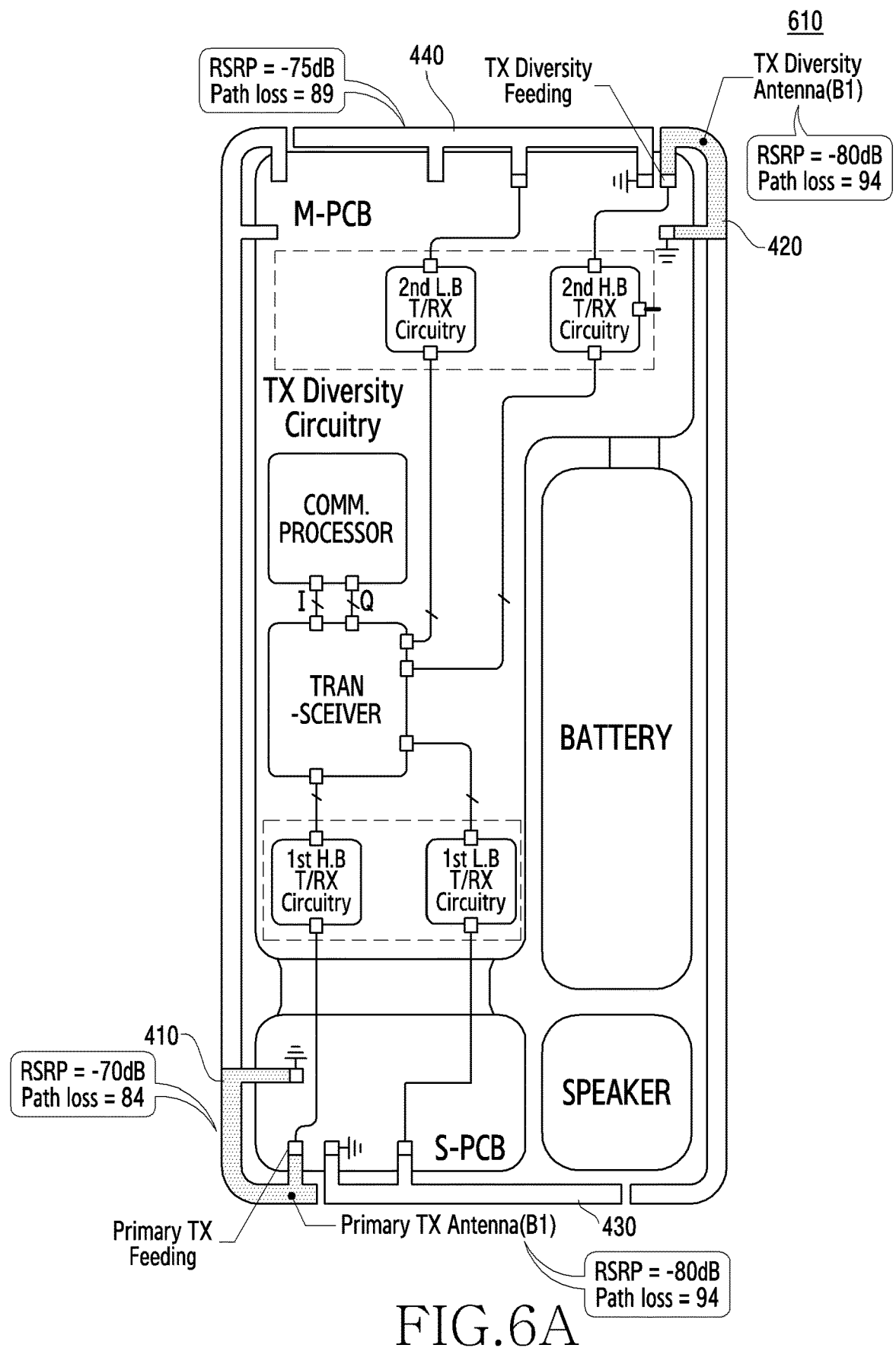
FIG. 6A illustrates measuring of a reference signal for each antenna in a wireless communication system according to various embodiments of the disclosure.

In operation 503, the electronic device 101 may acquire path loss values respectively corresponding to the plurality of antennas. The electronic device 101 may receive the same reference signal via the first antenna 410 to the fourth antenna 440, and may measure RX power. According to an embodiment, the electronic device 101 may measure RX power (i.e., Reference Signal Received Power (RSRP)) which differs for each antenna via the first antenna 410 to the fourth antenna 440. According to an embodiment, referring to FIG. 6A, RSRP values measured by the first antenna 410, the second antenna 420, the third antenna 430, and the fourth antenna 440 may be respectively −70 dB, −80 dB, −80 dB, and −75 dB. The RSRP values respectively corresponding to the plurality of antennas are inversely proportional to the path loss values. Thus, the path loss values of the first antenna 410, the second antenna 420, the third antenna 430, and the fourth antenna 440 may be measured respectively to be 84, 94, 94, and 89.

According to an embodiment, the RX power and the path loss value may be determined based on a surrounding environment. For example, when a user grips a lower end of the electronic device 101 by hand, strength of the reference signal received by the first antenna 410 and the fourth antenna 430 may be reduced. Therefore, RX power measured via the first antenna 410 and the third antenna 430 may be less than an RX power value measured via the second antenna 420 and the fourth antenna 440.

According to another embodiment, the measured RX power may be different depending on a relative distance between the base station and the first to fourth antennas 410 to 440.

Figure 6B:
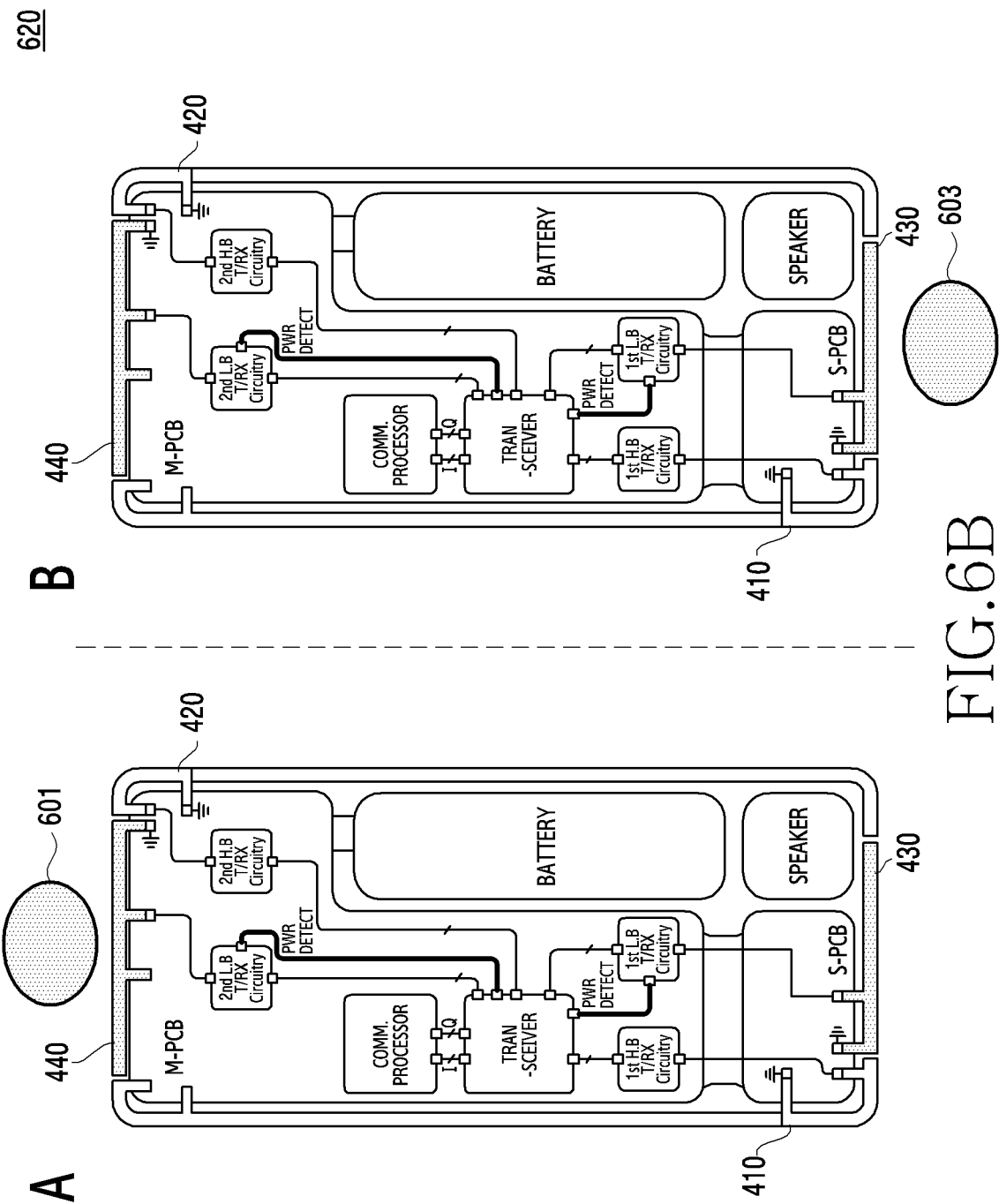
FIG. 6B illustrates measuring of a reference signal for each antenna, based on a position of a coupler, in a wireless communication system according to various embodiments of the disclosure.
Figure 6C:
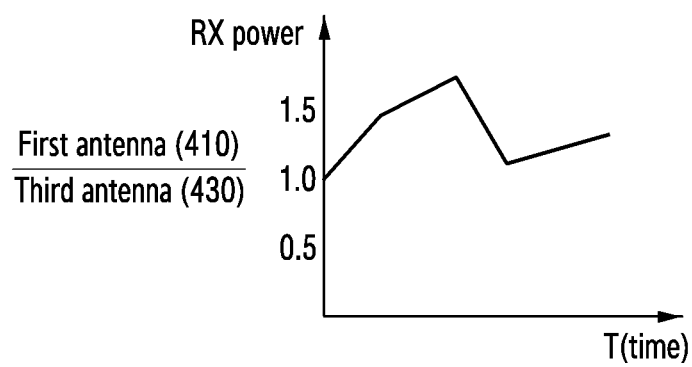
FIG. 6C illustrates a ratio of a path loss, based on time, in a wireless communication system according to various embodiments of the disclosure.
Figure 6C:
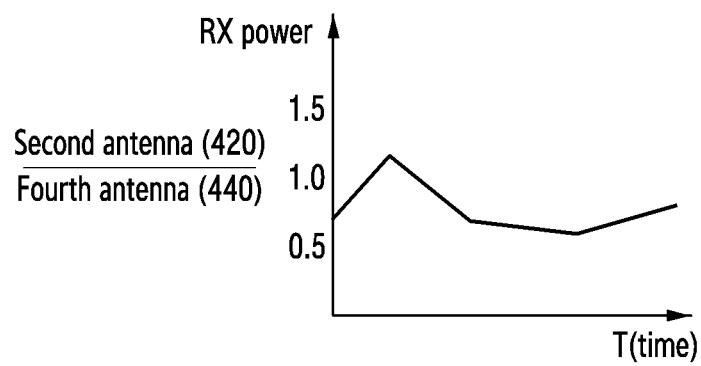

For example, referring to FIG. 6B, a case A in which a coupler 601 is located at an upper end of a housing may correspond to a case in which the upper end of the housing of the electronic device 101 faces a direction of the base station. The second antenna 420 and the fourth antenna 440 may be located relatively closer in distance to the base station, compared to the first antenna 410 and the third antenna 430. RX power values measured via the second antenna 420 and the fourth antenna 440 may be greater than RX power values measured via the first antenna 410 and the third antenna 430.

For another example, a case B in which a coupler 603 is located at a lower end of the housing may correspond to a case in which the lower end of the housing of the electronic device 101 faces a direction of the base station. The first antenna 410 and the third antenna 430 may be located relatively closer in distance to the base station, compared to the second antenna 420 and the fourth antenna 440. RX power values measured via the first antenna 410 and the third antenna 430 may be greater than RX power values measured via the second antenna 420 and the fourth antenna 440.

According to an embodiment, the electronic device 101 may acquire a path loss value, based on the measured RX power. The base station may broadcast information regarding TX power of a reference signal to all electronic devices located in cell coverage of the base station. For example, the electronic device 101 may acquire a TX power value when the reference signal is transmitted from the base station by using a parameter 'referenceSignalPower' included in System Information Block (SIB)2. The electronic device 101 may compare a TX power value of the reference signal acquired from the base station and an RX power value of the reference signal measured in the electronic device 101 to acquire information indicating a path loss, i.e., an attenuation level of a signal in a radio channel.

In operation 505, the electronic device 101 may identify at least two antennas. The electronic device 101 may identify at least two antennas for transmitting a signal to an external device or the base station. According to an embodiment, the electronic device 101 may identify two antennas for each frequency band. For example, the electronic device 101 may use the first antenna 410 and the second antenna 420 as a TX antenna for a high frequency band (e.g., an LTE B1 band, uplink: 1920 to 1980 MHz, downlink: 2110 to 2170 MHz, bandwidth: 60 MHz), and may use the third antenna 430 and the fourth antenna 440 as a TX antenna for a low frequency band (e.g., LTE B5 band, uplink: 824 to 849 MHz, downlink: 869 to 894 MHz, bandwidth: 25 MHz).

According to an embodiment, the electronic device 101 may receive uplink transmission information from the base station. For example, the electronic device 101 may acquire a timing at which SIB2 is transmitted, by receiving the SIB1 from the base station. The electronic device 101 may acquire information regarding an uplink frequency bandwidth, an uplink center frequency, an uplink power adjustment, or the like, by receiving the SIB2 from the base station. Therefore, the electronic device 101 may identify TX antennas for performing uplink transmission by receiving the SIB2 from the base station. For example, when the uplink frequency band indicated by the SIB2 corresponds to a high frequency band, the electronic device 101 may determine to perform uplink transmission by using the first antenna 410 and the second antenna 420. For another example, when the uplink frequency band indicated by the SIB2 corresponds to a low frequency band, the electronic device 101 may determine to perform uplink transmission by using the third antenna 430 and the fourth antenna 440.

In operation 507, the electronic device 101 may acquire a ratio of a path loss value corresponding to the identified antenna. The electronic device 101 may determine a ratio of TX power between identified two antennas. The ratio of the TX power may be determined by a ratio of a path loss between the identified two antennas. For example, the identified two antennas may correspond to the first antenna 410 and second antenna 420 for transmitting a signal of a high frequency band. The electronic device 101 may acquire the ratio of the path loss of the two antennas. For example, when a path loss value of a reference signal received via the second antenna 420 is 100 and a path loss value received via the first antenna 410 is 50, the electronic device 101 may determine a path loss ratio between the two antennas to 2:1.

In operation 509, the electronic device 101 may determine TX power for each antenna and transmit a signal, based on the ratio. According to an embodiment, the electronic device 101 may perform differential power distribution for the two antennas, based on the acquired power ratio. The ratio of TX power for each antenna may be determined to be inversely proportional to the ratio of the power loss for each antenna. For example, when a path loss ratio between the second antenna 420 and the first antenna 410 is 2:1, the electronic device 101 may set a differential power distribution ratio to 1:2. For example, a method of distributing power between two antennas may be as follows.

$$P1 = X * \frac{PL_2}{PL_1 + PL_2} \text{ [mW]} = 10\log\left(Y * \frac{PL_2}{PL_1 + PL_2}\right) [dBm] \quad (1)$$

$$P2 = X * \frac{PL_1}{PL_1 + PL_2} \text{ [mW]} = 10\log\left(Y * \frac{PL_1}{PL_1 + PL_2}\right) [dBm] \quad (2)$$

P1 may denote TX power of the first antenna 410. P2 may denote TX power of the second antenna 420. $PL_1$ may denote a path loss corresponding to the first antenna 410. $PL_2$ may denote a path loss corresponding to the second antenna 420. X may denote a target power value (dBm). Y may denote a value obtained by converting X into $10^{X/10}$ (mW).

The electronic device 101 may differentially distribute power depending on a path loss between TX antennas according to Equation (1) above, so that higher power is distributed to a TX antenna having a smaller path loss value, that is, a better air condition. Therefore, the electronic device 101 may achieve higher antenna output efficiency with the same TX power.

Figure 7A:
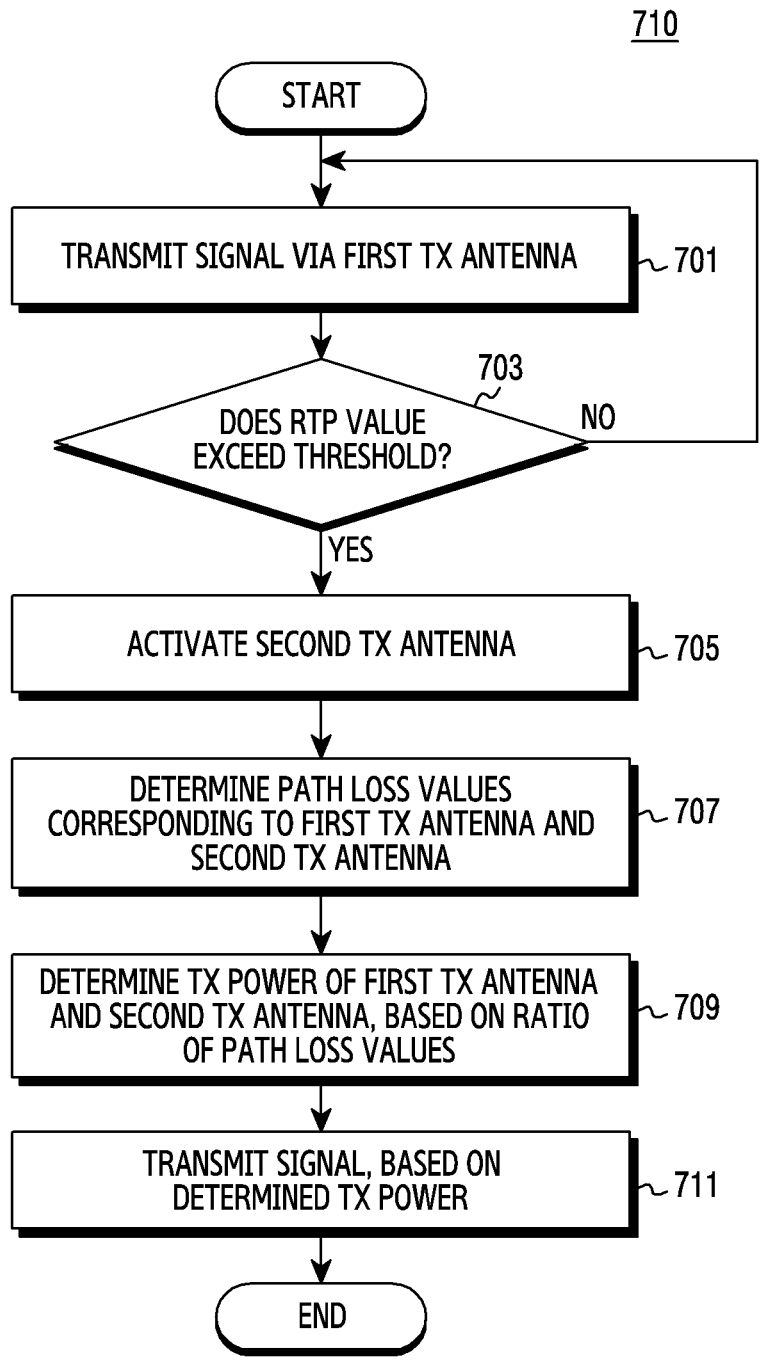
FIG. 7A illustrates a flowchart for initiating signal transmission based on differential power distribution of an electronic device in a wireless communication system according to various embodiments of the disclosure.

FIG. 7A illustrates a flowchart for initiating signal transmission based on differential power distribution of an electronic device in a wireless communication system according to various embodiments of the disclosure. In FIG. 7A, an operating method of an electronic device (e.g., the electronic device 101 of FIG. 1) is exemplified.

Figure 7B:
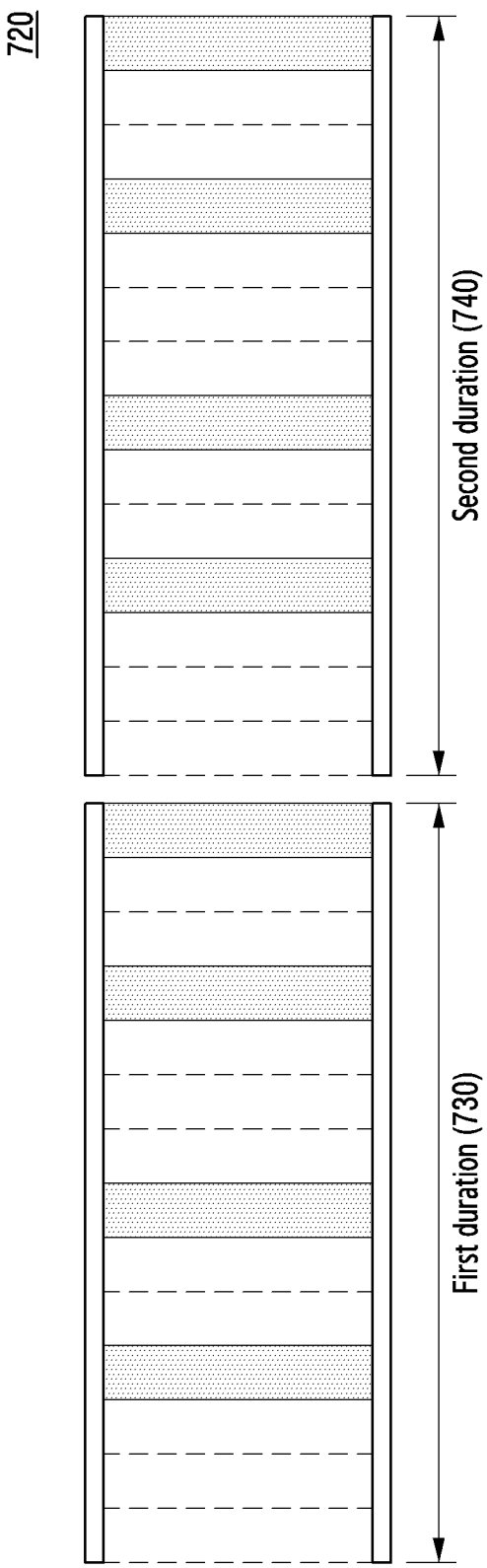
FIG. 7B illustrates a start timing of TX power distribution in a wireless communication system according to various embodiments of the disclosure.

Referring to FIG. 7A, in operation 701, the electronic device 101 may transmit a signal via a first TX antenna. FIG. 7B illustrates an uplink frame structure according to various embodiments of the disclosure. A duration in which a signal is transmitted via the first TX antenna may correspond to a first duration 730 as shown in FIG. 7B. That is, the electronic device 101 may perform omni-directional communication by using a single antenna (e.g., the first TX antenna).

In operation 703, the electronic device 101 may determine whether a Received Target Power (RTP) value exceeds a threshold value. According to an embodiment, the electronic device 101 may receive, from a base station, information regarding a target power value required to perform communication with the base station. For example, the base station may indicate to the electronic device 101 a power value expected to be transmitted by the electronic device 101 through SIB2. According to an embodiment, the electronic device 101 may determine whether the RTP value exceeds a pre-defined threshold power value. For example, if the RTP value exceeds the pre-defined threshold power value (e.g., 20 dB), the electronic device 101 may perform TX diversity by using a multi-TX antenna. For another example, if the RTP value exceeds the pre-defined threshold power value, the electronic device 101 may maintain omni-directional communication by using a single antenna (e.g., the first antenna 410).

In operation 705, the electronic device 101 may activate a second TX antenna. If the RTP value exceeds the pre-defined threshold power value, the electronic device 101 may activate the second TX antenna to perform TX diversity. The second TX antenna to be activated may be determined based on information regarding an uplink frequency bandwidth and center frequency and included in the SIB2 received from the base station. For example, if the center frequency and the frequency bandwidth indicated by the SIB2 correspond to a low frequency band, the fourth antenna 440 may be activated as the second TX antenna. For another example, if the center frequency and the frequency bandwidth indicated by the SIM correspond to a high frequency band, the second antenna 420 may be activated as the second TX antenna.

In operation 707, the electronic device 101 may determine path loss values corresponding to the first TX antenna and the second TX antenna. In order to acquire a ratio of a path loss between the first TX antenna and the second TX antenna, the electronic device 101 may determine a path loss value measured based on reference signal reception of each antenna.

According to an embodiment, the electronic device 101 may acquire information regarding the ratio of the path loss via the memory 220 at an activation timing of the second TX antenna. The memory 220 may store information regarding the ratio of the path loss for each frequency band. For example, the memory 220 may update, on a real-time basis, information regarding a ratio of a path loss of the first antenna 410 and second antenna 420 corresponding to a high frequency band. A period in which the memory 220 updates the information regarding the ratio of the path loss may be one subframe. For another example, the memory 220 may update, on a real-time basis, information regarding a ratio of a path loss of the third antenna 430 and fourth antenna 440 corresponding to a low frequency band. A period in which the memory 220 updates the information regarding the ratio of the path loss may be one subframe. That is, if an RTP value exceeds a pre-defined threshold power value, the electronic device 101 may transmit, to the memory 220, information regarding a frequency band indicated from the base station, and may receive, from the memory 220, path loss information of antennas corresponding to the indicated frequency band.

In operation 709, the electronic device 101 may determine TX power of the first TX antenna and second TX antenna, based on the ratio of the path loss values. The electronic device 101 may determine a distribution ratio of the TX power by receiving from the memory 220 a path loss value corresponding to the first TX antenna and a path loss value corresponding to the second TX antenna. For example, if the path loss value corresponding to the first TX antenna is 100 and the path loss value corresponding to the second TX antenna is 50, the ratio of the path loss may be 2:1. Thereafter, the electronic device 101 may determine the TX power, based on the ratio of the path loss. The electronic device 101 may allocate the RTP value from the BS, to the first TX antenna and the second TX antenna, so as to be inversely proportional to the ratio of the path loss. For example, if the ratio of the path loss of the first TX antenna and the second TX antenna is 2:1 and the target power value is 100 mW, power that can be allocated by the first TX antenna may be 33.3 mW which is ⅓ of 100 mW and power that can be allocated by the second TX antenna may be 66.6 mW which is ⅔ of 100 mW.

In operation 711, the electronic device 101 may transmit a signal, based on the determined TX power. That is, the electronic device 101 may transmit an output signal of the first TX antenna with a power value of 66.6 mW, and may transmit an output signal of the second TX antenna with a power value of 33.3 mW.

The electronic device 101 according to various embodiments may transmit a signal by allocating high power to an antenna having a small path loss value, i.e., an antenna having a good radio channel environment, thereby improving output efficiency.

The electronic device 101 according to various embodiments may update information regarding a path loss value corresponding to a plurality of RX antennas from a communication start timing using a single TX antenna before performing TX diversity using a plurality of TX antennas. Accordingly, the electronic device 101 may perform TX diversity using differential power distribution without additional data collection at a timing of starting the TX diversity, based on information regarding the updated path loss value, and referring to FIG. 7B, at a timing of changing from the first duration 730 to the second duration 740.

Methods based on the embodiments disclosed in the claims and/or specification of the disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an embodiment of the disclosure via an external port. In addition, an additional storage device on a communication network can have an access to the device for performing the embodiment of the disclosure.

In the aforementioned specific embodiments of the disclosure, a component included in the disclosure is expressed in a singular or plural form according to the specific example embodiment proposed herein. However, the singular or plural expression is selected properly for a situation proposed for the convenience of explanation, and thus the various embodiments of the disclosure are not limited to a single or a plurality of components. Therefore, a component expressed in a plural form can also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

The invention claimed is:

1. An operating method of an electronic device, comprising:
    transmitting a first signal through a first antenna;
    receiving a target power value from a base station through the first antenna;
    determining whether the target power value exceeds a threshold power value;
    in response to the target power value exceeds the threshold power value, receiving a reference signal from the base station via the first antenna and a second antenna;
    acquiring a first path loss value corresponding to the first antenna and a second path loss value corresponding to the second antenna, based on the reference signal;
    acquiring a ratio for the first path loss value and the second path loss value based on the first path loss value and the second path loss value;
    determining a first Tx power of the first antenna and a second Tx power of the second antenna, based on the acquired ratio and the target power value; and
    transmitting a first signal by applying the first Tx power to the first antenna, and transmitting a second signal by applying the second Tx power to the second antenna.

2. The operating method of claim 1,
    wherein a ratio of TX power of the first antenna corresponds to a ratio that the second path loss value occupies in a sum of the first path loss value and the second path loss value, and
    wherein a ratio of TX power of the second antenna corresponds to a ratio that the first path loss value occupies in the sum of the first path loss value and the second path loss value.

3. The operating method of claim 1, further comprising:
    determining a third path loss value corresponding to the third antenna;
    determining a fourth path loss value corresponding to the fourth antenna; and
    acquiring the ratio, based on the third path loss value and the fourth path loss value.

4. The operating method of claim 3,
    wherein a ratio of TX power of the third antenna corresponds to a ratio that the fourth path loss value occupies in a sum of the third path loss value and the fourth path loss value, and
    wherein a ratio of TX power of the fourth antenna corresponds to a ratio that the third path loss value occupies in the sum of the third path loss value and the fourth path loss value.

5. The operating method of claim 1,
    wherein the path loss values are determined based on at least one of Reference Signal Received Power (RSRP), Received Signal Strength Indication (RSSI), and Reference Signal Received Quality (RSRQ), and
    wherein the RSRP, the RSRI, and the RSRQ are determined as an average value for a specific duration.

6. The operating method of claim 1, further comprising transmitting the first signal by using the first antenna, if the target power value is less than or equal to the threshold power value.

7. An electronic device comprising:
    a memory;
    a plurality of antennas; and
    a processor,
    wherein the processor is configured to:
        transmit a first signal through a first antenna;
        receive a target power value from a base station through the first antenna;
        determine whether the target power value exceeds a threshold power value;
        in response to the target power value exceeds the threshold power value, receive a reference signal from the base station via the first antenna and a second antenna;
        acquire a first path loss value corresponding to the first antenna and a second path loss value corresponding to the second antenna, based on the reference signal;
        acquire a ratio for the first path loss value and the second path loss value based on the first path loss value and the second path loss value
        determine a first Tx power of the first antenna and a second Tx power of the second antenna, based on the acquired ratio and the target power value; and
        transmit a first signal by applying the first Tx power to the first antenna, and transmit a second signal by applying the second Tx power to the second antenna.

8. The electronic device of claim 7,
    wherein a ratio of TX power of the first antenna corresponds to a ratio that the second path loss value occupies in a sum of the first path loss value and the second path loss value, and
    wherein a ratio of TX power of the second antenna corresponds to a ratio that the first path loss value occupies in the sum of the first path loss value and the second path loss value.

9. The electronic device of claim 7,
    wherein the processor is configured to:
    determine a third path loss value corresponding to a third antenna;
    determine a fourth path loss value corresponding to a fourth antenna; and
    acquire the ratio, based on the third path loss value and the fourth path loss value,
    wherein a ratio of TX power of the third antenna corresponds to a ratio that the fourth path loss value occupies in a sum of the third path loss value and the fourth path loss value, and wherein a ratio of TX power of the fourth antenna corresponds to a ratio that the third path loss value occupies in the sum of the third path loss value and the fourth path loss value.

10. The electronic device of claim 7, wherein the processor is configured to:
transmit the first signal by using one antenna among the antennas, if the target power value is less than or equal to the threshold power value.

11. The operating method of claim 1, further comprising a third antenna, and a fourth antenna,
wherein the first antenna and the second antennas transmit and receive the second signal corresponding to a first frequency band,
wherein the third antenna and the fourth antenna transmit and receive a third signal corresponding to a second frequency band, and
wherein the first frequency corresponds to a frequency higher than the second frequency.

12. The electronic device of claim 7, further comprising a third antenna, and a fourth antenna,
wherein the first antenna and the second antennas transmit and receive the second signal corresponding to a first frequency band,
wherein the third antenna and the fourth antenna transmit and receive a third signal corresponding to a second frequency band, and
wherein the first frequency corresponds to a frequency higher than the second frequency.

* * * * *